UNITED STATES PATENT OFFICE.

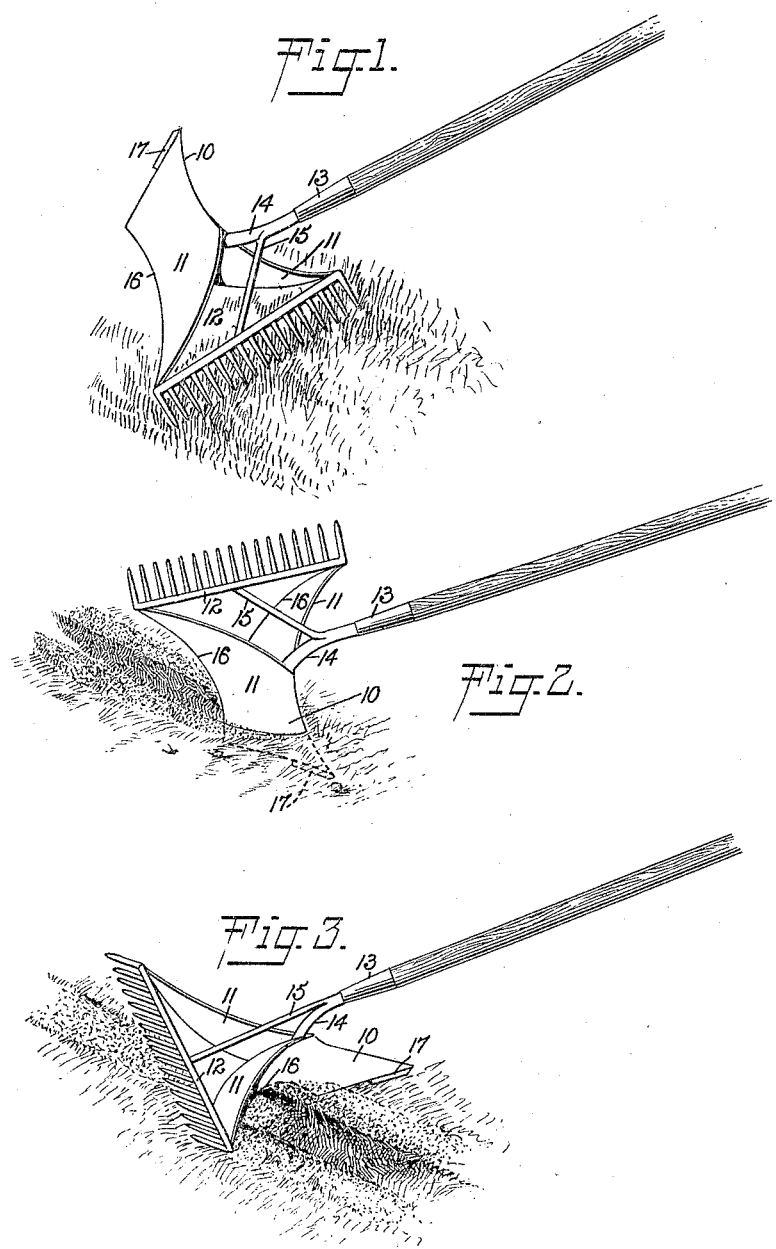

ALPHONSE S. BERNARD, OF SPRECKELS, CALIFORNIA.

GARDEN IMPLEMENT.

1,232,188.  Specification of Letters Patent.  Patented July 3, 1917.

Application filed February 9, 1917. Serial No. 147,578.

*To all whom it may concern:*

Be it known that I, ALPHONSE S. BERNARD, a citizen of the United States, and a resident of Spreckels, in the county of Monterey and State of California, have invented a new and Improved Garden Implement, of which the following is a full, clear, and exact description.

An object of my invention is to provide a combination garden implement having an element that may be employed for raking spaded ground, and a plow that may be employed for forming a furrow or for use as a seed coverer, and to so construct said implement that while it will possess substantial strength it will at the same time be so light as to be operable without the expenditure of material strength and therefore may be used with facility by a boy or by a woman.

More specific objects of the invention are to provide a garden implement including a double-mold board plow and a rake constituting a girt between the mold boards, and to provide in a garden implement a mold board so formed that its rear edge will constitute an effective seed coverer when the plow is turned on its side.

The distinctive features and the advantages of my improved implement will be more clear as the description proceeds.

Reference is to be had to the accompanying drawings forming a part of this specification in which similar reference characters indicate corresponding parts in all the views.

Figure 1 is a perspective view of my improved implement when employed to rake the ground in preparation for seeding and planting;

Fig. 2 is a perspective view of the implement inverted from the position shown in Fig. 1;

Fig. 3 is a perspective view of the implement turned over at one side to constitute a seed coverer.

In constructing a garden implement in accordance with my invention, a plow is provided, presenting a plow point 10 and double-mold boards 11 integral with the point, said mold boards diverging rearwardly and on curved lines. At the upper outer terminals of the plow boards a transverse rake 12 is provided, the back of which is connected with the respective mold boards and constitutes a girt between the same.

A handle socket 13 is provided on a shank 14 which is secured to the plow at the front between the convergent portions of the mold boards 11. Also, a brace 15 extends from said shank 14 to the back of the rake 12.

The rear edge 16 of each mold board 11 is concave, so that the mold board, when the plow is turned on its side, will constitute an effective seed coverer, the ends of the curved edge extending forwardly as shown in Fig. 3, so that the dirt is gathered in from both sides of the furrow in filling the same to cover the seed.

The tool is designed to be used in the successive positions represented in the figures of the drawing, the rake being first used, and then an effective manner of using the tool is to form two furrows the length of the plot by drawing the plow first in one direction and then returning. Then, after the two furrows have been planted, a concave edge 16 is drawn over the furrows in succession. In this manner much time is saved and there is avoided the undue trampling of the ground as is done in working with the usual implements. To present a concave edge 16 to the ground, the plow may be turned over on either of its sides.

The plow point 10 may have any suitable shoe 17 at the under side thereof if desired.

By the described construction it will therefore be seen that the several elements have such correlation as to be employed with facility in the desired succession and that the various parts may be made from light material and yet result in a strong construction.

Having thus described my invention I claim as new, and desire to secure by Letters Patent:

1. A garden implement including a plow, said plow having double-mold boards, and a point; and a transverse rake, the back of which constitutes a girt between the upper rear terminals of the mold boards.

2. A garden implement including a plow, said plow having double-mold boards, and a point; and a transverse rake, the back of which constitutes a girt between the upper rear terminals of the mold boards; together with a shank secured to the plow at the front between the mold boards, a handle socket on said shank, and a brace extending from the said shank to the said back of the rake.

3. A garden implement including a plow having double-mold boards, a handle connected with the plow at the juncture of the mold boards and extending forwardly, a transverse member extending between and connecting the mold boards at the upper edges thereof adjacent to the back edge and a brace extending from the handle to the said carriage.

ALPHONSE S. BERNARD.

Copies of this patent may be obtained for five cents each, by addressing the "Commissioner of Patents, Washington, D. C."